Patented Apr. 14, 1953

2,635,102

UNITED STATES PATENT OFFICE 2,635,102

BORON DERIVATIVES OF ASCORBIC ACID

Simon L. Ruskin, New York, N. Y.

No Drawing. Original application March 12, 1945, Serial No. 582,418. Divided and this application August 9, 1951, Serial No. 241,150

2 Claims. (Cl. 260—344.5)

The present invention relates to the manufacture of improved therapeutic preparations, and more particularly to boron or boron acid derivatives of ascorbic acid and its salts.

It is the general object of the invention to produce boron or boron acid derivatives of ascorbic acid and its salts which derivatives possess one or more important advantages over the original substances from the standpoint of therapeutic activity, stability, increased solubility, reduced hygroscopicity, etc. Other objects and advantages of the invention will become apparent from the following detailed description thereof.

I have found that in general the boron derivatives of ascorbates possess a remarkably increased therapeutic activity or efficiency over the original materials.

The boron derivatives of ascorbic acid and its salts, such as bor ascorbic acid, calcium bor ascorbate, sodium bor ascorbate, etc., possess not only improved healing properties but also greater stability than the original compounds. In my previous work on calcium ascorbate I have demonstrated more rapid progress in the healing of wounds treated with calcium ascorbate directly or by parenteral injection, and such work has been confirmed by others. (See Bourne, Lancet of December 5, 1942, "Vitamin C and repair of injured tissues," pages 662 and 663.) I have now found that the boron derivative, which may be called calcium bor ascorbate, effects an even more marked improvement in wound healing than calcium ascorbate itself. This I attribute to a rather unique effect of the calcium bor ascorbate on cell growth; for epithelial proliferation and connective tissue growth can be observed to be speeded up as compared to control wounds on the same animals. The stability of calcium bor ascorbate is also greater than that of calcium ascorbate, and this is probably attributable to the fact that while calcium ascorbate is highly hygroscopic, calcium bor ascorbate is only slightly so. Although it is known that the ascorbates bear an inverse relationship to the hemoglobin level in the blood, I have nevertheless found that the ferro- and ferri-bor ascorbates have a tendency to increase the hemoglobin level. This may be due to the fact that the bor ascorbates improve the utilization of the iron reserves of the body.

My improved compounds are characterized also by a generally reduced toxicity. Thus the toxicity of bor ascorbate is unusually low for a boron compound. Whereas death may result from the ingestion of 15 to 30 grams of borax or of 2 to 5 grams of boric acid, no such degree of toxicity can be observed with the bor ascorbates, and they appear to be non-toxic in amounts far beyond the therapeutic dosage. The calcium and sodium bor ascorbates can accordingly be used as a dusting powder on wounds, particularly burns, without danger of toxic effects; and in the form of tablets for oral use they may be used in dosages up to 1000 mg., while in solution they may be packaged in ampules containing 250 mg. of the boron-salt complex.

The heavy metal compounds of the bor ascorbates, such as bismuth and antimony bor ascorbates, are more stable and less toxic than the corresponding bismuth and antimony ascorbates. The same increased degree of stability has been noted by me in the boron derivatives of iron, manganese, tin, magnesium, zinc, mercury, gold and arsenic ascorbates, and likewise of iodo, fluoro and brom ascorbates.

In preparing my improved compounds, it is generally sufficient to mix the ascorbate in solution or suspension with a suitable quantity of boric or metaboric acids. Combining proportions may be used, but it is entirely feasible to employ a larger proportion of the ascorbate, as the smaller proportion of boric acid is sufficient to stabilize more than the combining proportion of the ascorbate. Thus an aqueous solution of a soluble metal ascorbate may be combined with boric acid with the aid of moderate heating and separation effected by the addition of a suitable solvent in which the product is relatively insoluble. This mode of preparation can be applied also to the free ascorbic acid.

More specific directions for the preparation of representative compounds of the present invention are set forth in the following example which is presented for purposes of illustration only and not as indicating the limits of the invention.

EXAMPLE

Calcium bor ascorbate

To 120 cc. of aqueous syrup containing 45 gm. of calcium ascorbate are added 7 gm. of boric acid. Under mechanical stirring the paste is heated at 50° C. for twenty minutes. 2000 cc. of methyl alcohol are now added and a partial precipitation occurs. On standing in the refrigerator over night a heavy precipitate forms which can readily be filtered off and dried in vacuo. The amorphous powder represents a yield of approximately 90% of theoretical and is only slightly hygroscopic in contrast to the high hygroscopicity of calcium ascorbate.

The temperature of reaction in the above example may be as high as 80° C. whereby the solubility is increased and the reaction speeded up.

Although the boron compounds of the alkali metal and alkaline earth metal derivatives of ascorbic acid are generally more soluble than the parent metal compounds, in the case of the heavy metal compounds, the treatment with boric or metaboric acid will yield relatively insoluble substances. These can be used by insufflation or the open treatment of wounds, or they may be suspended in various vehicles like oils.

The nature of the reaction produced by the treatment with the boric acid, with or without added alkali metal borate, is not entirely clear. Because of the double valence of boron (3 and 5) and also because in certain instances it exhibits a valance of 4, a number of reactions usually take place.

As already indicated, I may use metaboric in place of boric acid. However, the use of boric acid is preferred as in certain instances the compounds obtained with the metaboric acid are less stable. However, because the linkage is more easily severed by acid hydrolysis in the case of the metaboric acid compounds, the ascorbate preparations have an important advantage from the standpoint of oral administration, since the gastric acidity speeds the utilization. This advantage applies also to the products prepared with boric acid, so that the therapeutic preparations are rendered stable before use and readily available by hydrolysis upon ingestion.

What has been said hereinabove in connection with ascorbic acid and the ascorbates applies equally well to both the laevo and dextro forms. The dextro compounds will have a lower vitamin C activity, but they represent excellent compounds for administering therapeutic metals like calcium because of the stabilizing action of the boron.

It will be clear from the foregoing that the boron acids can be combined not only with the metal derivatives of ascorbic acid but also with the ascorbic acid itself.

This application is a division of my prior application Serial No. 582,418, filed March 12, 1945.

I claim:

1. A boron-ascorbic acid compound which is the reaction product of boric acid and a member of the group consisting of ascorbic acid and its metal salts.

2. A calcium boron ascorbic acid compound which is a reaction product of boric acid and calcium ascorbate.

SIMON L. RUSKIN.

No references cited.